United States Patent [19]

Oda et al.

[11] Patent Number: 5,012,771

[45] Date of Patent: May 7, 1991

[54] INTAKE SYSTEM FOR MULTI-CYLINDER ENGINE

[75] Inventors: Hiroyuki Oda, Hiroshima; Toshimitsu Tanaka, Yamaguchi; Naoyuki Yamagata; Kazuhiko Hashimoto, both of Hiroshima, all of Japan

[73] Assignee: Mazda Motor Corporation, Hiroshima, Japan

[21] Appl. No.: 485,876

[22] Filed: Feb. 28, 1990

[30] Foreign Application Priority Data

Feb. 28, 1989 [JP] Japan ................................ 1-49392

[51] Int. Cl.⁵ .............................................. F02M 35/10
[52] U.S. Cl. ......................... 123/52 MB; 123/52 MC
[58] Field of Search .......... 123/52 M, 52 MB, 52 MC, 123/52 MF, 52 ML, 52 MV

[56] References Cited

U.S. PATENT DOCUMENTS 4,643,138  2/1987  Ruf et al. ......................... 123/52 M
4,932,368  6/1990  Abe et al. ....................... 123/52 MV

FOREIGN PATENT DOCUMENTS 2930697  2/1981  Fed. Rep. of Germany ........ 123/52 MV
60-14169  4/1985  Japan .
0117920  5/1989  Japan ............................... 123/52 M
0117921  5/1989  Japan ............................... 123/52 M Primary Examiner—David A. Okonsky
Attorney, Agent, or Firm—Fleit, Jacobson, Cohn, Price, Holman & Stern

[57] ABSTRACT

An intake system is incorporated in a multi-cylinder internal combustion engine having a plurality of cylinders. The intake system includes an intake manifold having a plurality of discrete intake passages connected to the plurality of cylinders, respectively, and two intake pipes, each intake pipe being arranged in such a way as to descend substantially vertically downwardly from a communicating portion where the intake pipe communicates with each of two groups of the intake passages, turns to extend horizontally in one longitudinal direction of the engine body and then turns back to extend in the opposite longitudinal direction of the engine body surrounding the discrete intake passages. The two groups of the discrete intake passages are connected to two groups of the cylinders which in each and the same group are not intended to be fired one after another.

6 Claims, 8 Drawing Sheets

INTAKE SYSTEM FOR MULTI-CYLINDER ENGINE

FIELD OF THE INVENTION

The present invention relates to an intake system for a multi-cylinder engine, and more particularly to an intake system for a multi-cylinder engine in which an intake collecting pipe communicating with discrete intake pipes of an intake manifold is lengthened as long as possible, thereby swelling resonance effects so as to increase output torque of the multi-cylinder engine at low engine speeds.

BACKGROUND OF THE INVENTION

It is known to provide an intake system with a supercharger developed with improved charging efficiency by utilizing kinetic effects, such as inertia effects or resonance effects, of intake air by providing two intake pipes, respectively, communicating with two groups of discrete intake passages connected to two groups of cylinders of an engine which in each and the same group are not intended to be fired one after another, respectively. One known type of such an intake system is adapted to increase intake charging efficiency by setting a synchronizing engine speed desirable for providing inertia effects at a low speed. Such an intake system is disclosed in Japanese Patent Publication No. 60-14169 entitled "Intake System For Multi-Cylinder Engine" issued April 11, 1985.

The provision of the intake system described in the above publication, in which inertia effect is intensified in a range of low engine speeds, allows engines with a turbo-charger to compensate for a decrease of intake charging efficiency caused by a decrease of driving force of a turbine of the turbo-charger in a range of low engine speeds.

The use of such an intake system has, however, a drawback that a setting of the synchronizing speed desirable for obtaining favorable inertia effects within a predetermined range of engine speed requires intake pipes whose overall length is considerably long, making it difficult to build a compact intake system.

SUMMARY OF THE INVENTION

It is, therefore, a primary object of the present invention to provide an intake system for a multi-cylinder internal combustion engine which is entirely compact and having a sufficient length intake pipe.

The above primary object is accomplished by providing an intake system for a multi-cylinder internal combustion engine having an engine body which includes a plurality of cylinders. The intake system comprises an intake manifold having a plurality of discrete intake passages connected to the plurality of cylinders, respectively, and two intake pipes, each intake pipe being arranged in such a way as to descend substantially vertically downwardly from a communicating portion where the intake pipe communicates with each of two groups of the intake passages, turns to extend horizontally in one longitudinal direction of the engine body and then turns back to extend in the opposite longitudinal direction of the engine body surrounding the discrete intake passages.

The two groups of discrete intake passages are connected to two groups of the cylinders which in each and the same group are not intended to be fired one after another.

The two communicating portions are preferably disposed laterally to the engine body and arranged horizontally side by side, thereby laying the two intake pipes in parallel with each other. The intake pipe may, if desirable, descend downwardly from the communication portion.

The arrangement of the intake pipes surrounding the discrete intake passages allows to incorporate sufficiently long intake pipes without making the intake system bulky.

BRIEF DESCRIPTION OF THE DRAWINGS

Still other aspects of the present invention and more specific features will become apparent to those having ordinary skill in the art from the following description of the preferred embodiments considered together with the accompanying drawings, wherein like reference numbers have been used in different figures to denote the same parts in structure and operation and in which.

DETAILED DESCRIPTION OF THE PREFERRED EMBODIMENTS

An intake system in accordance with a preferred embodiment of the present invention includes a multi-cylinder, in-line internal combustion engine. Because such multi-cylinder, in-line internal combustion engines are well known, this description will be directed in particular to elements forming part of, or cooperating directly with, the intake system embodying the present invention. It is to be understood, however, that engine elements not specifically shown or described may take various forms known to those skilled in the art. It is noted that the term "front side" of the engine body 2 as used herein should mean and refer to the upper side as viewed in FIG. 1.

Figure 1:
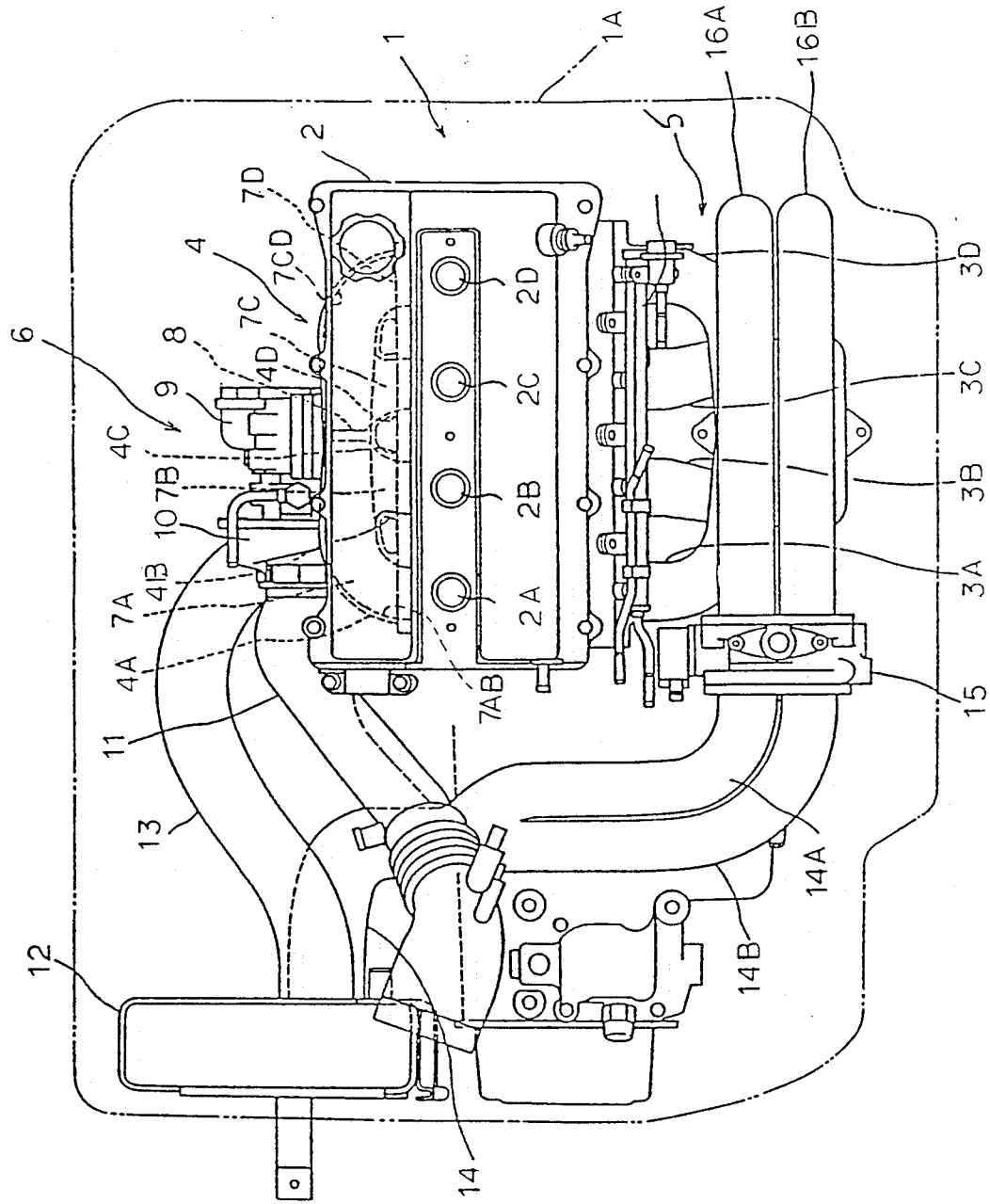
FIG. 1 is a plan view showing a four-cylinder, in-line engine having an intake system in accordance with a preferred embodiment of the present invention.
Figure 2:
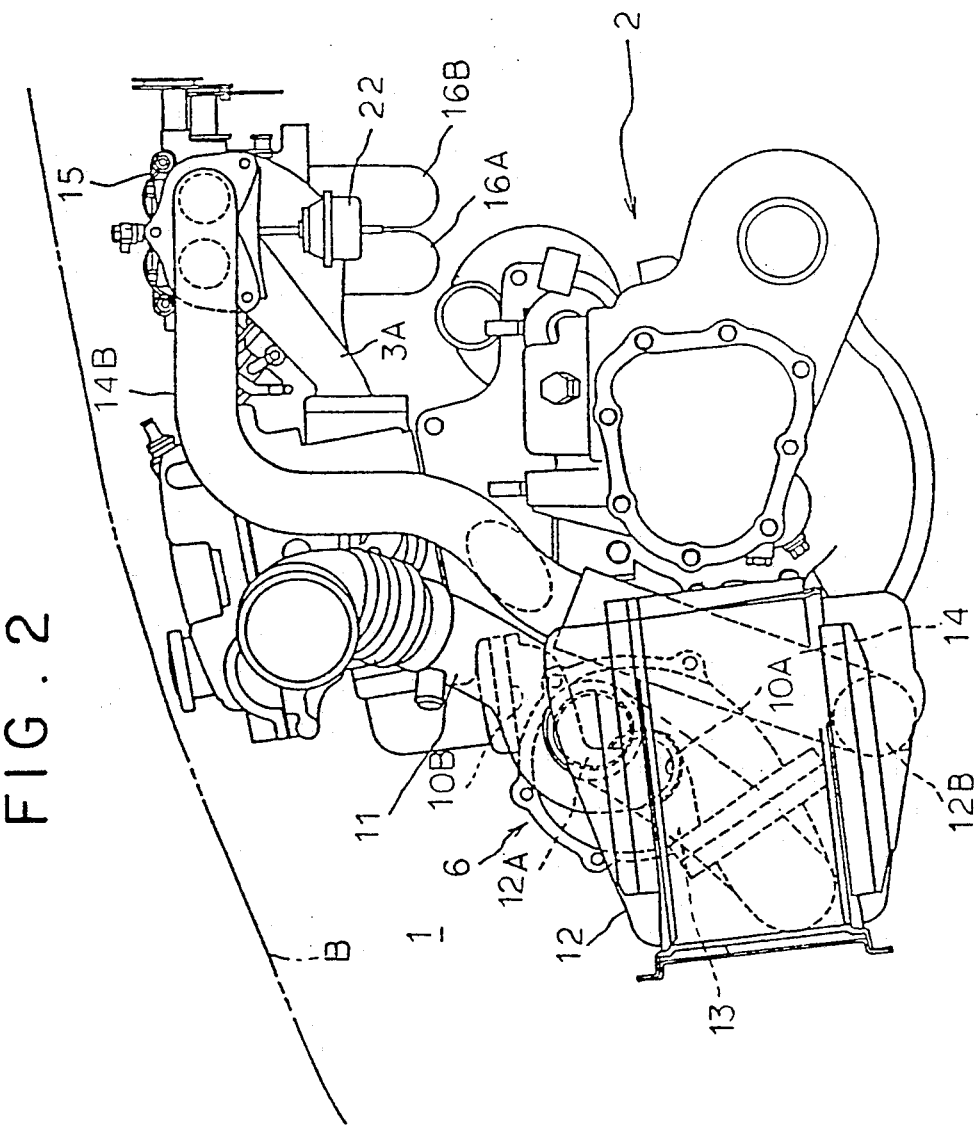
FIG. 2 is a front view of FIG. 1.

Referring to the drawings, particularly to FIGS. 1 and 2, an engine body 2 of a four cylinder, in-line internal combustion engine, which is carried sideways in an engine compartment 1 defined by a fender and a hood outlined in double-dotted lines 1A and 1B in FIGS. 1 and 2, respectively, having an intake system in accordance with a preferred embodiment of the present invention is shown.

The engine body 2 is formed with No. 1, No. 2, No. 3 and No. 4 cylinders 2A to 2D in order from the front side of the engine body 2. The engine body 2 is attached at its rear side with an intake manifold 3 which has first to fourth discrete intake pipes 3A to 3D connected to the cylinders No. 1 to No. 4 cylinders 2A to 2D, respectively, and is usually cast from iron. The engine body 2 is further attached at its front side with an exhaust manifold 4 having first to fourth discrete exhaust pipes 4A to 4D connected to the first to the fourth cylinders 2A to 2D, respectively. Connected to the intake manifold 3 is a fuel distribution pipe 5 disposed above and along the first to fourth discrete intake pipes 3A to 3D and in a lengthwise direction of the engine body 2. This fuel distribution pipe 5 is provided with first to fourth fuel injection nozzles (not shown) for delivering a correct amount of fuel into the first to fourth cylinders 2A to 2D, respectively, for any given engine demand. On the other hand, disposed below the exhaust manifold 4 is a turbocharger 6 for forcing air, under exhaust powered pressure, into the first to fourth cylinders 2A to 2D. In the exhaust manifold 4, exhaust passages 7A to 7D respectively formed in the first to fourth discrete exhaust pipes 4A to 4D are divided into two groups for two cylinder groups, namely a first group of the first and second cylinders 2A and 2B and a second group of the third and fourth cylinders 2C and 2D, by a partition wall 8 and the passages in each group are communicated in one and the same connecting pipe 7AB, 7CD independently connected to a turbine 9 of the turbocharger 6.

Connected to the turbocharger 6 through the turbine 9 thereof is a blower 10 having an inlet port 10A which opens toward the front side of the engine body 2 and is connected to an intake pipe 11 with an airflow meter and an air cleaner (not shown) and an outlet port 10B opening at its bottom which is connected to an inlet port 12A of an intercooler 12 by way of an intake pipe 13.

The intercooler 12, disposed on one lateral side of the engine body 2 near the front end of the engine room 2, is connected at the inlet port 12A formed in an upper portion of its side wall to the blower 10 of the turbocharger 6 by way of the intake pipe 13 and at its outlet port 12B formed right below the inlet port 12A in the side wall to an upstream end of an upstream side intake collecting pipe 14. The intake collecting pipe 14 branches off into two, namely first and second, upstream side intake collecting pipe branches 14A and 14B which are connected at their downstream end to one ends of barrels 15A and 15B of double barrel type throttle body 15, respectively. Connected to the opposite ends of the barrels 15A and 15B of the double barrel type throttle body 15, respectively, are first and second downstream side intake collecting pipes 16A and 16B, which are made of aluminum pipe, surrounding the intake manifold 3.

Figure 3:
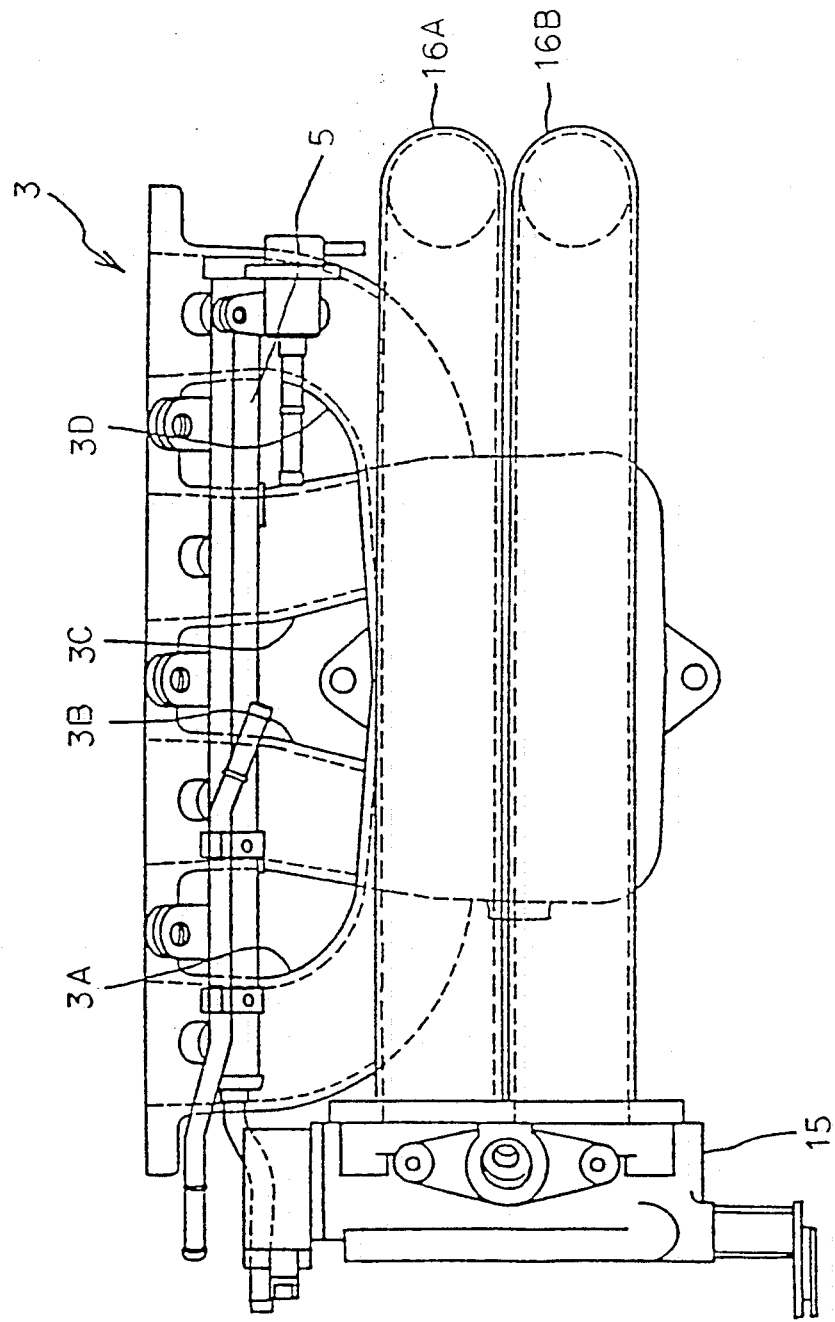
FIG. 3 is an enlarged plan view of the intake system shown in FIG. 1.
Figure 4:
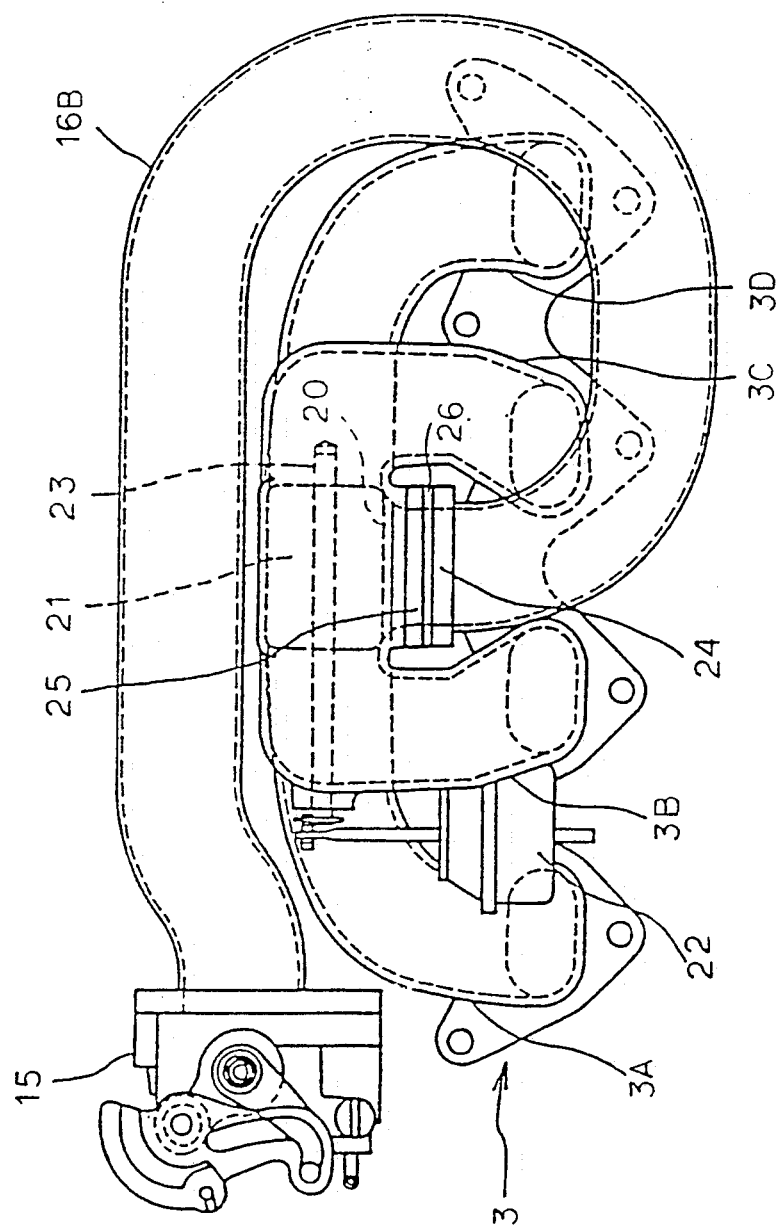
FIG. 4 is a right side elevational view of FIG. 3.
Figure 5:
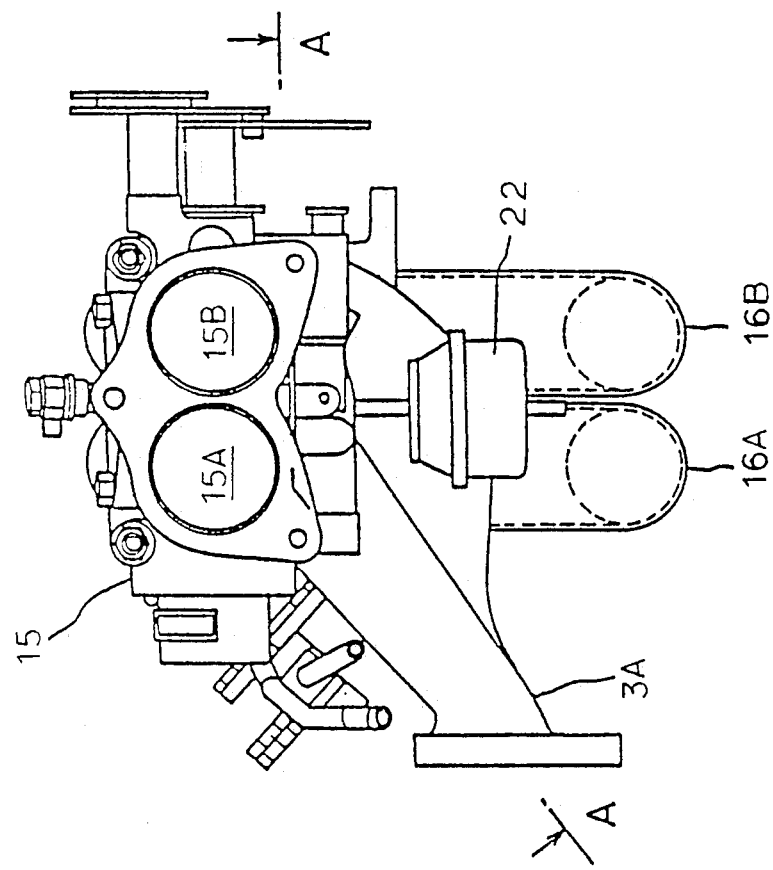
FIG. 5 is a front view of FIG. 3.

FIGS. 3 to 5 show the layout of the intake manifold 3 and its associated elements in detail. As shown, the first and second downstream side intake collecting pipes 16A and 16B, which are disposed side by side and horizontally in parallel with each other, extend from the first cylinder 2A toward the fourth cylinder 2D along the lateral side of the engine body 2 in a longitudinal direction in which the first to fourth cylinders 2A to 2D are disposed in order from the front side of the engine body 2, turning back around the fourth discrete intake pipe 3D toward the first discrete intake pipe 3A and further extending substantially vertically upwardly between the second and third discrete intake pipes 3B and 3C. The first and second downstream side intake collecting pipes 16A and 16B are connected at their downstream ends, which are formed with flanges 25, 24, to the intake manifold 3.

Figure 6:
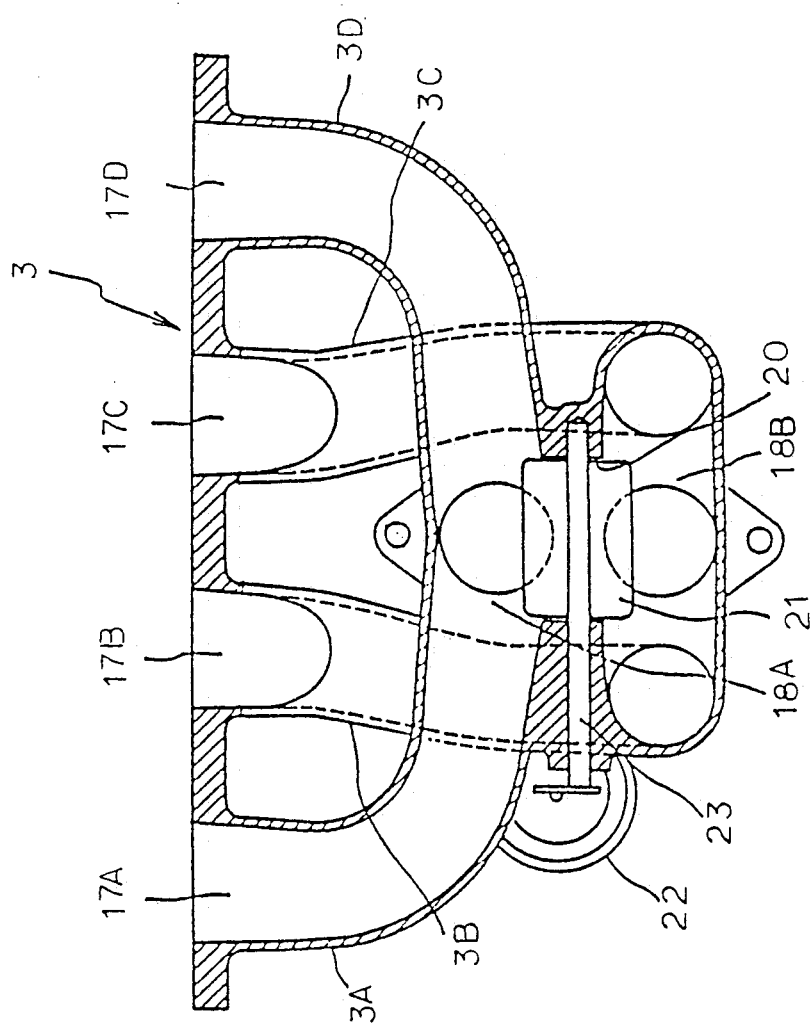
FIG. 6 is a cross-sectional view take along line A—A in FIG. 5.

The intake manifold 3, as is clearly shown in FIG. 6, has a first connecting pipe portion 18A interconnecting passages 17A and 17D defined by the first and fourth discrete intake pipes 3A and 3D and a second connecting pipe portion 18B interconnecting passages 17B and 17C defined by the second and third discrete intake pipes 3B and 3C. The intake manifold 3 is placed so as to horizontally juxtapose these first and second connecting pipe portions 18A and 18B to each other putting the first connecting pipe portion 18A inside. These first and second connecting pipe portions 18A and 18B of the intake manifold 3 are, on one hand, connected to the first and second downstream side collecting pipes 16A and 16B, respectively, through their flanges 25 and 24 with gaskets 26 interposed therebetween and, on the other hand, communicated with each other by way of a passage 20 having a rectangular cross-section and oriented perpendicularly to the engine body 2 in its longitudinal direction, which passage 20 is provided therein with a butterfly valve 21. This butterfly valve 21 has a valve shaft 23 with its one end provided with an actuator 22 of the type of diaphragm.

By laying the first and second downstream side intake collecting pipes 16A and 16B to surround the intake manifold 3 it is possible to take advantage of a space generally left around the intake manifold 3 and allows to provide the first and second downstream side intake collecting pipes 16A and 16B in a compact space and with long passages. Additionally, because of the first and second downstream side intake collecting pipes 16A and 16B having a substantially equal length, distribution of intake air between the first and second downstream side intake collecting pipes 16A and 16B can be improved in various proportions. Furthermore, because of the first and second downstream side intake collecting pipes 16A and 16B are aluminum pipes, the intake pipe system is apt to crush upon a car crash, thereby absorbing shock so as to protect a fuel system disposed in cooperation therewith.

Figure 7:
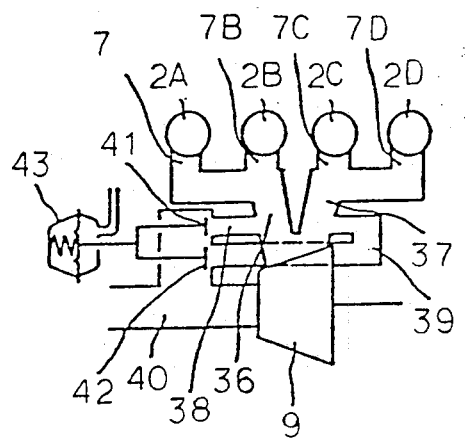
FIG. 7 is a diagrammatical illustration showing an exhaust system incorporated in the four-cylinder, in-line engine of FIG. 1.

Reference is now made to FIG. 7 diagrammatically illustrating an exhaust system cooperating with the engine intake system of the preferred embodiment of the present invention as depicted in FIGS. 1 through 6. First and second exhaust collecting pipes 36 and 37, are commonly connected to the first and second exhaust passages 7A and 7B and third and fourth exhaust passages 7C and 7D, respectively, communicate with the turbine 9 of the turbocharger 6 independently from each other. Bypass pipes 38 and 39, connecting a downstream portion of an exhaust pipe 40 of the turbine 9 of the turbocharger 6 with respect to the engine body 1 to the first and second exhaust pipes 36 and 37, is laid out bypassing the turbine 9 of the turbocharger 6. Both of the bypass pipes 38 and 39 are, respectively, provided with waste-gate valves 41 and 42 which are driven by a common actuator 43.

Figure 8:
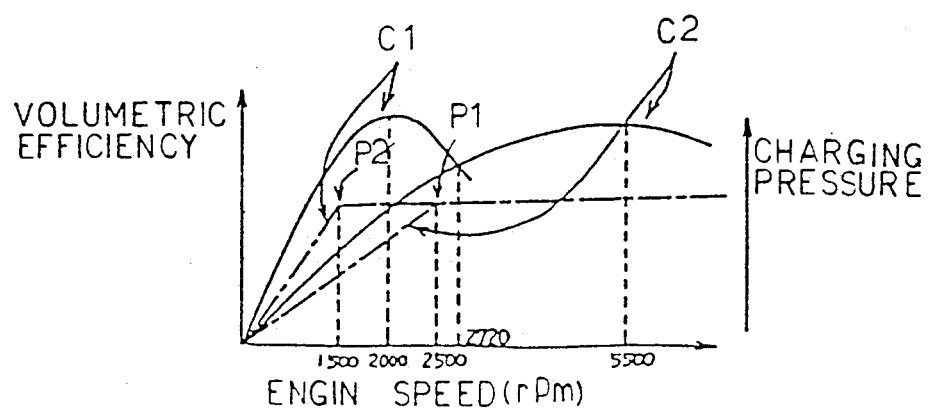
FIG. 8 is a graph of characteristic curves of supercharging pressure and volumetric efficiency relative to engine speed.

In the four cylinder, in-line internal combustion engine 2, the No. 1 cylinder 2A, the No. 3 cylinder 2C, the No. 4 cylinder 2D and the No. 2 cylinder 2B are fired in order. That is, the first to fourth cylinder 2A to 2D are divided into two groups and the cylinders in each group, which are connected to one and the same connecting pipe portion 18A, 18B of the intake manifold 3, do not fire one after another. The discrete interconnecting pipes 17A to 17D for the No. 1 to No. 4 cylinders 2A to 2D, the first and second downstream side intake collecting pipes 16A and 16B connected to the first and second connecting pipe portion 18A and 18B, and the first and second upstream side intake collecting pipe branches 14A and 14B of the upstream side intake collecting pipe 14 connected to the first and second downstream side intake collecting pipes 16A and 16B, respectively, through the throttle body 15 are so designed as to provide a synchronizing point for the most effective inertia in each pipe or lower pipe portion when the valve 21 is closed by the butterfly valve 21 at a speed of, for instance, 2,500 rpm at an intercept point P1 when the passage 20 is open, as is shown in FIG. 8. The synchronizing point is defined as a speed of the engine at which a frequency depending upon engine rotation and the natural frequency of the intake system are well synchronized. An intercept point P2 shifts toward the side of lower engine speeds when the passage 20 is closed. On the other hand, when the valve 21 is open to intercommunicate the first and second connecting pipe portions 18A and 18B, a synchronizing point for inertia effects shifts toward the side of higher engine speeds so as to form a synchronized intake system suitable for high engine speeds. The valve 21, when the passage 20 is open, is closed at engine speeds lower than a predetermined speed higher than the intercept point for a high engine speed synchronized intake system or opened at engine speed higher than the predetermined speed. Accordingly, when the passage 20 is closed under low engine speeds, intake charging efficiency or volumetric efficiency increases along the characteristic curve C1 for a closed passage, more sharply, relative to the characteristic curve C2 for an open passage as shown in FIG. 8. Furthermore, the rising of supercharging pressure is sharp, so as to improve the responsiveness of acceleration. In a range of high engine speeds, intake charging efficiency is increased by opening the passage 20.

Figure 9:
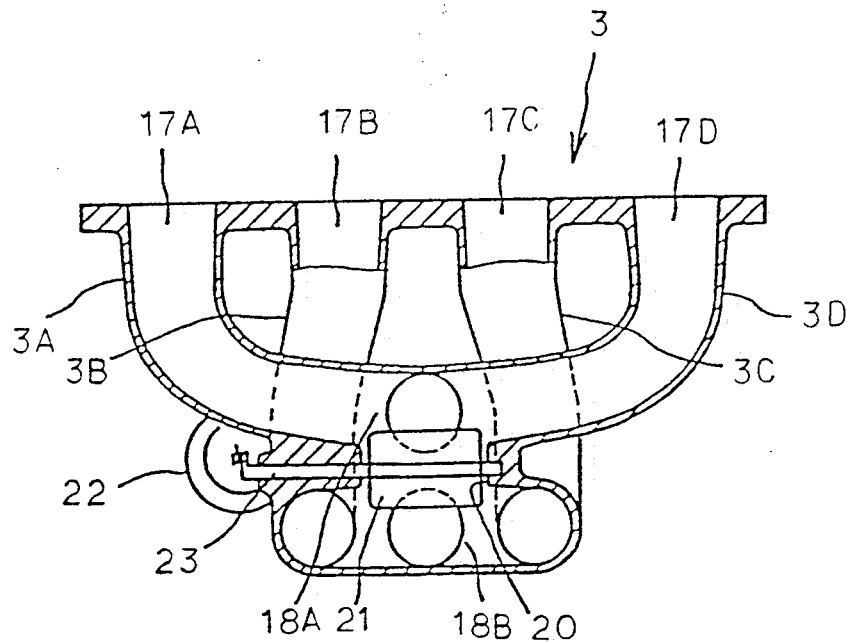
FIG. 9 is a side elevational view, similar to FIG. 6, showing an intake system in accordance with another preferred embodiment of the present invention.
Figure 10:
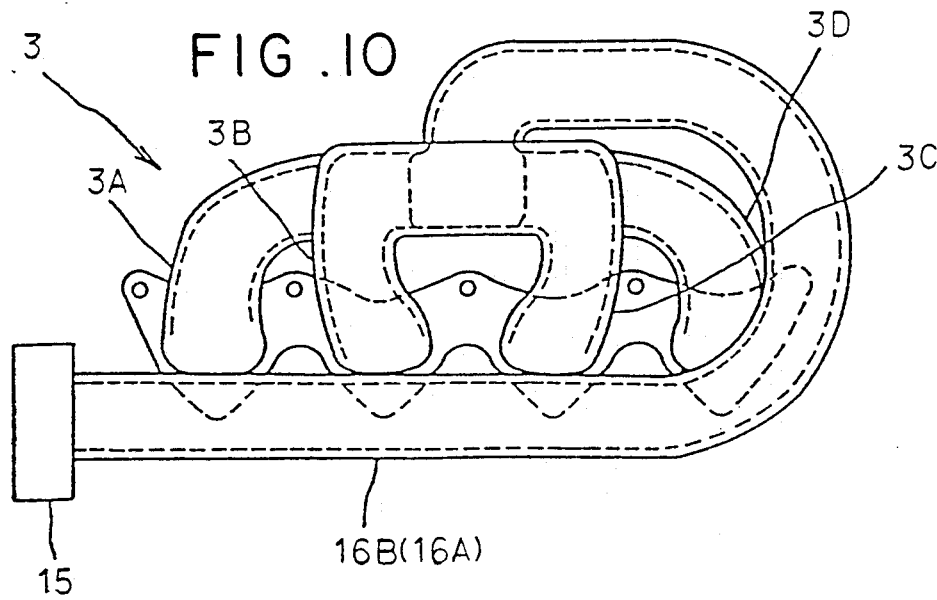
FIG. 10 is a cross-sectional view, similar to FIG. 4, showing the intake system of FIG. 9.

FIGS. 9 and 10 shows an intake system in accordance with another preferred embodiment of the present invention in which the downstream side intake collecting pipes 16A and 16B are differently laid out from the previous embodiment. As shown, the first and second downstream side intake collecting pipes 16A and 16B, both of which are connected at their downstream end to one end of barrels 15A and 15B of the two barrel type throttle body 15, respectively, extend under the intake manifold 3 in one longitudinal direction of the engine body 2, turn up at approximately a right angle and then turn back and extend in the other opposite longitudinal direction of the engine body 2.

It is to be noted that the intake system according to the present invention may be incorporated in a multi-cylinder internal combustion engine with no turbo charger provided.

It is also understood that whereas the invention has been fully described in detail with reference to the preferred embodiments, nevertheless, various other embodiments and variants are possible which are within the spirit and scope of the present invention, and such embodiments and variants are intended to be covered by the following claims.

What is claimed is:

1. An intake system for a multi-cylinder internal combustion engine, said intake system comprising:
    an engine having an engine body which includes a plurality of cylinders;
    an intake manifold having a plurality of discrete intake passages connected to said plurality of cylinders, respectively; and
    two intake pipes, respectively communicating with two groups of said discrete intake passages connected to two groups of said cylinders which in each and the same group are not intended to be fired one after another, each said intake pipe being arranged to extend substantially vertically from a communicating portion where each said intake pipe communicates with a respective one of said groups of said intake passages, turns to extend horizontally in one longitudinal direction of said engine body and turns back to extend in the opposite longitudinal direction of said engine body surrounding said discrete intake passages.

2. An intake system as defined in claim 1, wherein said two communicating portions are disposed laterally to said engine body and arranged horizontally side by side, thereby locating said two intake pipes in parallel with each other.

3. An intake system as defined in claim 2, wherein said communication of said two intake pipes is disposed midway of said discrete intake passages.

4. An intake system as defined in claim 1, wherein each said intake pipe rises substantially vertically upwardly from said communicating portion.

5. An intake system as defined in claim 1, wherein each said intake pipe descends substantially vertically from said communicating portion.

6. An intake system as defined in claim 1, wherein said engine has four cylinders arranged in-line.

* * * * *